UNITED STATES PATENT OFFICE.

RICHARD HERZ, OF FRANKFORT-ON-THE-MAIN, GERMANY, ASSIGNOR TO CASSELLA COLOR COMPANY, OF NEW YORK, N. Y.

INDOPHENOLIC COMPOUND AND PROCESS OF MAKING SAME.

966,092.   Specification of Letters Patent.   Patented Aug. 2, 1910.

No Drawing.   Application filed March 4, 1910.   Serial No. 547,212.

*To all whom it may concern:*

Be it known that I, RICHARD HERZ, doctor of philosophy, a subject of the Kingdom of Prussia, Germany, and a resident of Eyssen-eckstrasse 17, Frankfort-on-the-Main, Germany, have invented some new and useful Improvements in Indophenolic Compound and Processes of Making Same.

The object of my invention is the manufacture and production of new blue cotton dyestuffs, derived from (N—) substituted derivatives of carbazole.

I have discovered that by condensing p. nitrosophenol and analogous compounds with derivatives of carbazole, substituted in the imido group, viz. the N. alkyl or N. aryl carbazole, preferably in presence of concentrated sulfuric acid, new products of condensation are produced, showing the properties of indophenols. These new substances have probably the following general formula

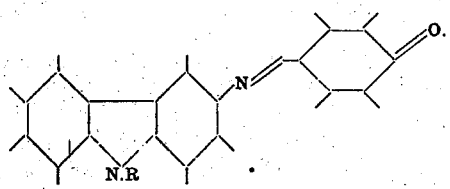

in which R means: (1) the alkyl group, viz. the methyl-, ethyl group; (2) the aryl group, viz. the phenyl-, benzyl- p. -tolylsulfonic group, etc. If these products of condensation, or their leuco compounds be heated with alkaline polysulfids, new dyestuffs containing sulfur in their molecule, are obtained, dyeing vegetable fibers indigo blue to pure blue shades which possess excellent fastness to washing, light and bleaching.

The production of methyl- and ethyl-carbazole is described in the *Annalen der Chemie*, Vol. 202, page 23, the hitherto unknown aryl-carbazoles are obtained in an analogous manner. For instance (N) benzyl-carbazole is obtained by heating the potassium salt of carbazole with benzyl-chlorid; it is insoluble in water, difficultly soluble in cold, more easily in hot alcohol and crystallizes from the latter in the form of colorless needles with a melting point of 118 to 120° C. The (N.) phenyl-carbazole crystallizes from hot alcohol in colorless needles with a melting point of 82 to 84° C.

The process of working of my invention is illustrated by the following examples:

*Example 1—Condensation of p. nitrosophenol and (N.) ethyl-carbazole.*—19.5 kilos of ethyl-carbazole are dissolved in about 200 kilos of cold concentrated sulfuric acid of 66° Bé. To this is added, while stirring and cooling well, a solution of 12.3 kilos of p. nitrosophenol in about ten times its weight of concentrated sulfuric acid. Preferably the temperature of the mixed solutions is not allowed to rise above 10° C. When the reaction is complete, the whole is poured on to ice, the separated product of condensation is filtered off and washed with water until it shows a neutral reaction. For the production of sulfid dyestuffs this product of condensation may be used as it is, or it may be reduced to the leuco compound by the usual methods; both the indophenols and their leuco compounds may be purified by extracting the raw products with suitable solvents, such as for instance hot alcohol which dissolves the pure bodies, but leaves the impurities undissolved.

The indophenols are in a dry state dark blue powders, insoluble in water, dilute acids and alkalies, but soluble with a blue violet color in methyl alcohol, with a reddish-violet color in chloroform, and with a magenta-red color in acetone. The leuco-indophenols are in a dry state crystalline grayish-white powders, insoluble in water, easily soluble in hot dilute caustic alkalies and also in sodium sulfid solution.

The manufacture of the dyestuffs may be effected by the usual methods of sulfurizing, for instance by heating the substances with alkaline-polysulfids, either in an aqueous solution with, or without the addition of glycerin, or in an alcoholic solution, or by melting the leuco bases with sulfur. The shades and properties of the resulting coloring matters vary according to the conditions of manufacture. As a rule, if the usual methods of sulfurizing be applied, blue dyestuffs result, possessing all the typical properties of the well-known sulfid dyestuffs. But if for the production of the coloring matters an alkaline polysulfid be used, containing a high percentage of sulfur, and further on, if the process be effected in presence of a suitable solvent for the indophenol or leuco-indophenol, preferably in an alcoholic solution, then almost exclusively dyestuffs result which are practically insoluble in dilute alkaline sulfid solution. These coloring matters can be reduced by a warm solution of alkaline hydrosulfite to a yellowish colored vat, and dye cotton in such a vat indigo-blue to pure-blue shades which exceed in their fastness to washing, light and bleaching, those produced with indigo.

*Example 2—Production of a blue vat dyestuff, derived from the indophenol, or leuco-indophenol, derived from p. nitrosophenol and (N.) ethyl-carbazole.*—80 kilos of sodium sulfid 60%, 160 kilos of finely ground sulfur, preferably "flower of sulfur" and 400 liters of alcohol are heated for several hours in a vessel provided with a reflux condenser, until the alkaline polysulfid is formed. Then 40 kilos of the pure, dry indophenol, derived from p. nitrosophenol and (N.) ethyl-carbazole, or the equivalent amount of the leuco base are added, and the heating is continued for about 48 hours. When the reaction is complete, the alcohol is distilled off and the residue diluted with water and filtered. The product thus obtained is then digested with a solution of sodium sulfid crystals whereby the superfluous sulfur and the small amounts of by-products, easily soluble in sodium sulfid solution, are dissolved. It is then filtered again and washed with water. The undissolved residue representing the pure vat dyestuff, if dried, is a dark blue powder with a metallic luster, almost insoluble in the usual organic solvents, soluble with a black-blue color in concentrated sulfuric acid, practically insoluble in dilute alkaline sulfid solution, but soluble with a pure yellow color in warm alkaline hydrosulfite solution, forming a vat and dyeing cotton in such a vat greenish-blue to bright blue shades fast to washing, light and bleaching.

Having now particularly described and ascertained the nature of my said invention and in what manner the same is to be performed, I declare that what I claim, is:

1. The process of making indophenolic compounds by condensing p. nitrosophenols with a derivative of carbazole substituted in the imido group, substantially as described.

2. The process of making fast blue dyestuffs which consists in condensing p. nitrosophenols with a derivative of carbazole substituted in the imido group and heating the products thus obtained, with alkaline polysulfids substantially, as described.

3. The process of making fast blue vat dyestuffs which consists in condensing p. nitrosophenols with a derivative of carbazole substituted in the imido group and heating the products thus obtained, with an alkaline polysulfid containing a high percentage of sulfur and preferably in presence of a suitable dissolving agent for the starting material, such as ethyl-alcohol, substantially as described.

4. As a new article of manufacture the indophenolic compounds derived from p. nitrosophenols and derivatives of carbazole, substituted in the imido group being in a dry state dark blue powders insoluble in water, dilute acids, and alkalies, soluble with a blue violet color in methyl-alcohol, with a reddish violet color in chloroform, with a magenta-red color in acetone and forming leuco compounds, if treated with the usual reducing agents, substantially as described.

5. As a new article of manufacture the fast blue sulfid dyestuffs derived from p. nitrosophenols and derivatives of carbazole substituted in the imido group being in a dry state dark blue powders with a metallic aspect, insoluble in water and alcohol, soluble with a bright blue color in hot phenol, easily soluble in an alkaline sulfid solution and dyeing from such a bath cotton fast indigo blue to bright blue shades, substantially as described.

6. As a new article of manufacture the fast blue vat dyestuffs derived from p. nitrosophenols and derivatives of carbazole, substituted in the imido group being in a dry state dark blue powders with a metallic aspect, insoluble in the usual organic solvents, soluble with a dark blue color in concentrated sulfuric acid, practically insoluble in a dilute alkaline sulfid solution, but soluble with a pure yellow color in warm alkaline hydrosulfite solutions forming a vat and dyeing cotton in such a vat indigo blue to bright blue shades fast to washing, light and bleaching, substantially as described.

In witness whereof I have hereunto signed my name this 21st day of February 1910, in the presence of two subscribing witnesses.

RICHARD HERZ.

Witnesses:
JEAN GRUND,
CARL GRUND.